US008433993B2

(12) United States Patent
Weinberger et al.

(10) Patent No.: US 8,433,993 B2
(45) Date of Patent: Apr. 30, 2013

(54) CONTEXT AWARE IMAGE REPRESENTATION

(75) Inventors: Kilian Quirin Weinberger, Mountainview, CA (US); Malcolm Slaney, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 561 days.

(21) Appl. No.: 12/491,217

(22) Filed: Jun. 24, 2009

(65) Prior Publication Data

US 2010/0332958 A1  Dec. 30, 2010

(51) Int. Cl.
*G06F 17/00* (2006.01)

(52) U.S. Cl.
USPC .......................................... 715/202; 717/201

(58) Field of Classification Search .................. 715/202, 715/201, 204
See application file for complete search history.

(56) References Cited

U.S. PATENT DOCUMENTS

| | | | | |
|---|---|---|---|---|
| 5,623,589 A * | 4/1997 | Needham et al. | ............ | 715/853 |
| 6,363,160 B1 * | 3/2002 | Bradski et al. | ............ | 382/103 |
| 6,760,884 B1 * | 7/2004 | Vertelney et al. | ............ | 715/202 |
| 6,839,880 B1 * | 1/2005 | Morse et al. | ............ | 715/202 |
| 6,964,025 B2 * | 11/2005 | Angiulo et al. | ............ | 715/838 |
| 7,454,711 B2 * | 11/2008 | Angiulo et al. | ............ | 715/760 |
| 7,526,725 B2 * | 4/2009 | Forlines | ............ | 715/723 |
| 7,917,511 B2 * | 3/2011 | Cannon et al. | ............ | 707/737 |
| 8,059,921 B2 * | 11/2011 | Frohlich et al. | ............ | 382/321 |
| 2001/0030667 A1 * | 10/2001 | Kelts | ............ | 345/854 |
| 2002/0087601 A1 * | 7/2002 | Anderson et al. | ............ | 707/515 |
| 2003/0091235 A1 * | 5/2003 | Xiong | ............ | 382/199 |
| 2004/0168118 A1 * | 8/2004 | Wong et al. | ............ | 715/500.1 |
| 2004/0218910 A1 * | 11/2004 | Chang et al. | ............ | 386/98 |
| 2005/0123886 A1 * | 6/2005 | Hua et al. | ............ | 434/307 A |
| 2006/0195475 A1 * | 8/2006 | Logan et al. | ............ | 707/104.1 |
| 2006/0253783 A1 * | 11/2006 | Vronay et al. | ............ | 715/730 |
| 2007/0086665 A1 * | 4/2007 | Kim et al. | ............ | 382/239 |
| 2007/0282908 A1 * | 12/2007 | Van der Meulen et al. | ............ | 707/104.1 |
| 2008/0215985 A1 * | 9/2008 | Batchelder et al. | ............ | 715/731 |
| 2009/0287990 A1 * | 11/2009 | Lynton et al. | ............ | 715/209 |
| 2009/0319472 A1 * | 12/2009 | Jain et al. | ............ | 707/2 |
| 2010/0083077 A1 * | 4/2010 | Paulsen et al. | ............ | 715/202 |
| 2010/0099456 A1 * | 4/2010 | Kim | ............ | 455/556.1 |
| 2010/0145947 A1 * | 6/2010 | Kolman et al. | ............ | 707/736 |
| 2010/0241939 A1 * | 9/2010 | Rozen-Atzmon | ............ | 715/202 |
| 2010/0266155 A1 * | 10/2010 | Goell et al. | ............ | 382/100 |
| 2011/0181624 A1 * | 7/2011 | Nugara | ............ | 345/690 |
| 2012/0095817 A1 * | 4/2012 | Kamil et al. | ............ | 705/14.4 |
| 2012/0233565 A1 * | 9/2012 | Grant | ............ | 715/776 |

OTHER PUBLICATIONS

Davis et al., From LContext to Content: Leveraging Context to Infer Media Metadata, ACM 2004, pp. 188-195.*
Schafer et al., Group Storytelling for Team Awareness and Entertainment, ACM 2004, pp. 441-444.*

(Continued)

*Primary Examiner* — Cong-Lac Huynh
(74) *Attorney, Agent, or Firm* — Martine Penilla Group, LLP

(57) ABSTRACT

Methods and system for rendering context aware multimedia content include identifying a plurality of multimedia content that is uploaded for rendering. The uploaded multimedia content is examined to determine metadata associated with each of the plurality of multimedia contents. Contextual information associated with the metadata is identified and a grouping of the multimedia content into a plurality of groups is performed based on the contextual information. Each of the plurality of groups is then integrated into one or more photo stories. The photo stories are defined and rendered as content rich documents.

19 Claims, 4 Drawing Sheets

OTHER PUBLICATIONS

Boll et al. MetaXa—Context-and Content-Driven Metadata Enhancement for Personal Photo Books, Springer 2007, pp. 332-343.*

Dachselt et al., TimeZoom: A Flexible Detai and Context Timeline, ACM 2006, pp. 682-687.*

Harada et al., Lost in Memories: Interacting with Photo Collections on PDAs, ACM 2004, pp. 325-333.*

"Position-Annotated Photographs: A Geotemporal Web"—Published by IEEE CS and IEEE ComSoc—Apr.-Jun. 2003 (pp. 72-79).

* cited by examiner

CONTEXT AWARE IMAGE REPRESENTATION

BACKGROUND

1. Field of the Invention

The present invention relates to managing multimedia content uploaded by users, and more particularly to create content rich documents for rendering multimedia content uploaded by users.

2. Description of the Related Art

As internet usage has increased over the years, various applications and features have been developed to engage the interest of a user. One way of engaging the interest of a user is to allow the user to publish and share documents and other multimedia contents. One such feature is multimedia content sharing, such as photo and video sharing. The photo and video sharing feature provides the user with the ability to publish or transfer the user's digital photos, videos and other multimedia content online and share them with other users. Multimedia content sharing functionality can be provided through a website or an application. A multimedia content sharing application allows a user to upload photos, videos and other multimedia content onto a computer system, such as a user's personal computer, organize and share the content with other users. A photo gallery is one such application in which the uploaded contents are organized in ways desirable by a user. The photo gallery application is wholly setup and managed by one or a group of users. The multimedia content in the photo gallery can also be set up to be shared by other users.

Multimedia content sharing websites, such as Flickr™, are designed as a means to provide permanent and centralized access to photos, videos and other multimedia content files. The content, style and presentation of the multimedia content on the webpage vary from one website to another. Mobile devices, such as cell phones with photo capturing/storing ability and running photo sharing applications, are also used. Most of the photo sharing applications and websites allow a user to upload the photos and other multimedia content and organize them into albums. These albums are designed and managed by the users. Once the users upload the multimedia content onto the websites, they invariably never visit them again. This may be due to the fact that organizing the albums in meaningful ways is time consuming and process intensive. It may also be due to the fact that interest in the uploaded multimedia content may be waning or limited due to limited exposure as the content sharing features of a website/application are localized and are not broadly shared or distributed even when the access is made public.

It is in this context that the embodiments of the invention arise.

SUMMARY

Embodiments of the present invention provide methods and system for rendering context aware multimedia content. A plurality of multimedia content uploaded for rendering are first identified. The uploaded multimedia content is then examined to determine metadata associated with each of the plurality of multimedia content. Contextual information associated with the multimedia content is identified from the examined metadata. The multimedia content is grouped into a plurality of groups based on the contextual information. The groups are then integrated into one or more content rich documents that define a photo story.

The embodiments of the present invention provide a more entertaining way of viewing and sharing multimedia content. The photo stories rendered by the content rich documents capture the interest and engage the attention of other users. As more and more users are engaged in viewing the content and the photo stories gain in popularity, users are inspired to create more and more photo stories and content rich documents and become active in publishing more and more multimedia content. Additionally, other features, such as linking the content rich documents to other websites, provide additional flexibility and exposure.

It should be appreciated that the present invention can be implemented in numerous ways, such as, methods, system and apparatus. Several inventive embodiments of the present invention are described below.

In one embodiment, a method for rendering context aware multimedia content is disclosed. The method includes identifying a plurality of multimedia content that is uploaded for rendering. The uploaded multimedia content is examined to determine metadata associated with each of the plurality of multimedia contents. Contextual information associated with the metadata is identified and a grouping of the multimedia content into a plurality of groups is performed based on the contextual information. Each of the plurality of groups is then integrated into one or more photo stories. The photo stories are defined and rendered as content rich documents.

In another embodiment, a system for rendering context aware multimedia content on a client is described. The system includes a content classifier and management module disposed on a server. The content classifier and management module includes logic to classify and manage multimedia content. The content classifier and management (classifier) module includes an upload detector logic to identify a plurality of multimedia content uploaded for rendering. A metadata handler logic within the classifier module is used to examine the uploaded multimedia content to determine metadata associated with each of the plurality of multimedia content, identify contextual information associated with the multimedia content from the metadata and perform a grouping of the multimedia content into a plurality of groups based on the contextual information. Each of the plurality of groups is associated with a distinct category. A media story generator logic within the classifier module is used to generate a media story using the metadata associated with a grouping of the multimedia content, if a media story is not already created for the grouping. The classifier module also includes a media update agent logic to integrate the one or more groups into one or more photo stories based on the metadata. The one or more photo stories are defined using mini-webpages for rendering the groups of multimedia content. The system also includes a media storage database to store the multimedia content, the metadata and the photo stories associated with the multimedia content for future mining.

The embodiments of the invention provide a way to classify and manage multimedia content for rendering on a client. By developing photo stories using contextual information and rendering these photo stories along with the multimedia content in content rich documents, a user is able to attract the attention of more and more viewers. As the popularity of the photo stories increases, the owners of the multimedia content are encouraged to become more active thereby engaging the users for a longer period of time. Thus, the embodiments of the invention not only attract viewers to the mini websites to view the rendered multimedia content but also encourage the owners and other users of the multimedia content to become more active in utilizing the system. Additionally, the system provides greater flexibility to the users by enabling the one or more users to add additional metadata to the multimedia content rendered on the client so as to better describe or fine tune the photo story rendered. The additional metadata is stored in a multimedia content database along with the original metadata and used to better categorize and manage the multimedia content for subsequent rendering at the client.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and systems for rendering a context aware multimedia content on a client. The methods and system include identifying a plurality of multimedia content that is uploaded for rendering. The uploaded multimedia content is examined to determine metadata associated with each of the plurality of multimedia content. Contextual information associated with the plurality of multimedia content is identified and the multimedia content is grouped into a plurality of groups based on the contextual information. The groups are then integrated into corresponding one or more photo stories. The photo stories are generated as content rich documents for rendering on the client.

The methods and algorithm (tool) provide a way to make the viewing of the multimedia content interesting and entertaining so as to engage the user for a longer period of time. The embodiments not only engage users but also have the potential of increasing user traffic making it a desirable tool for advertisements and other revenue generating applications. Additionally, it also enables users to personalize their photo stories by allowing users to add additional tags that are updated to the metadata of the corresponding multimedia content in substantial real time thus providing greater flexibility towards customization to the users.

It should be understood that the features of the embodiments may be in the form of a multimedia content classification and management (classifier) algorithm with logic instructions that can be stored on a computer readable medium and executed on a computer system. In this application, the terms logic and module are used interchangeably to mean a piece of program that is used to perform a certain task. Alternately, the classifier algorithm may be available to the computer system but does not have to be integrally coupled to the computer system. Towards this end, the various features and functionalities of the current embodiments will now be described in detail with reference to the drawings.

Figure 1:
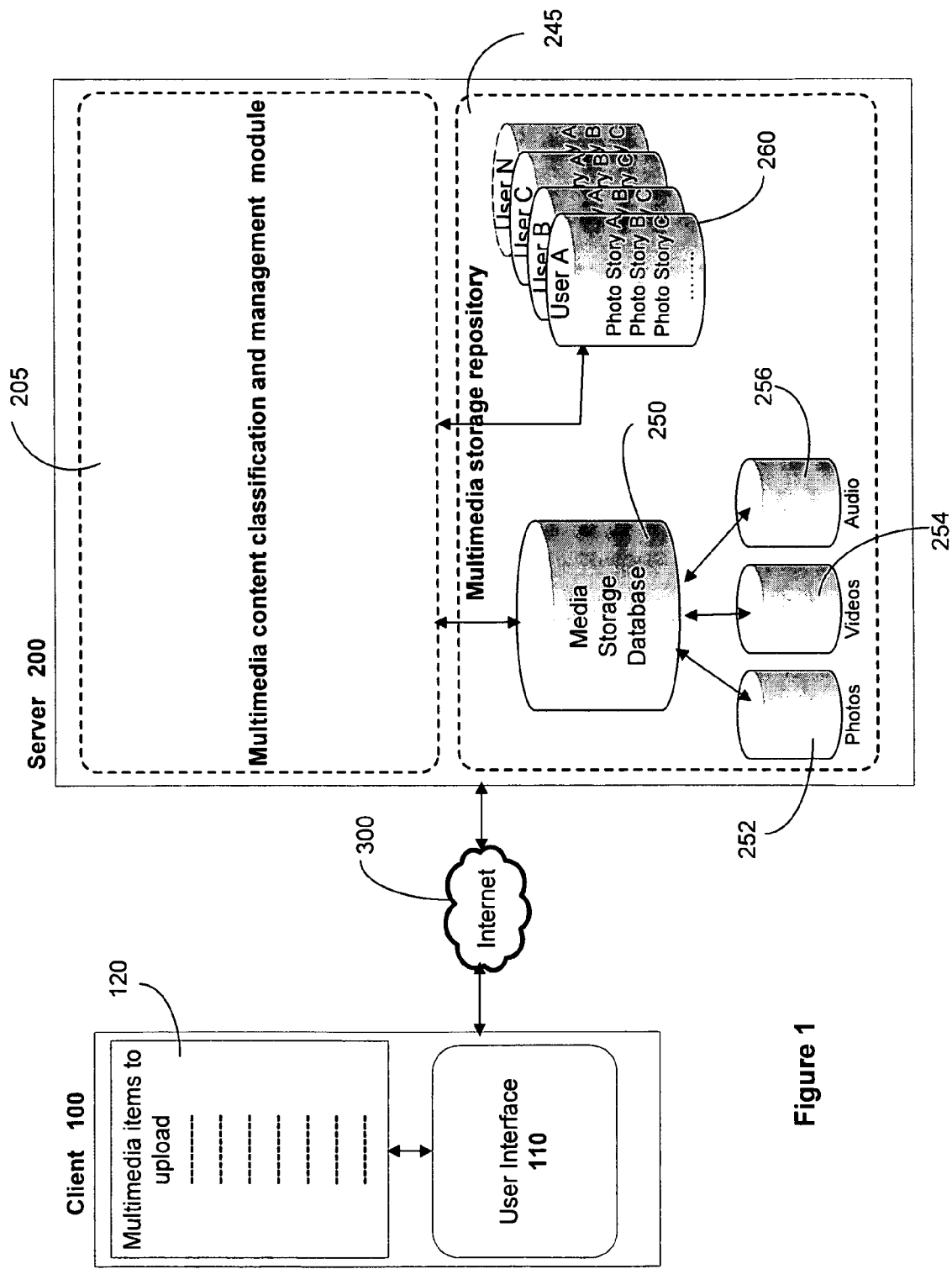
FIG. 1 illustrates a simple block diagram of a system used for rendering context aware multimedia content, in one embodiment of the invention.

FIG. 1 illustrates a simplified block diagram of a system used for rendering context aware multimedia content. The system includes a client 100 with a user interface to upload a plurality of multimedia content for rendering. The system also includes a multimedia content classification and management (classifier) module 205 provided on a server 200. The user interface on the client 100 is used for user authentication, uploading of the plurality of multimedia content and for interacting with the classifier module 205 on the server 200 through the internet 300. In one embodiment, the classifier module 205 is a software code that includes logic to identify a plurality of multimedia content that is uploaded from a client 100, examine the multimedia content to determine the metadata associated with each of the plurality of multimedia content, identify the contextual information associated with the multimedia content from the metadata, group the multimedia content into a plurality of groups and integrate the groups into one or more photo stories. It should be noted here that each of the plurality of groups represent a distinct category. The system further includes a media storage repository 245 for storing the uploaded multimedia content received from the client 100, the metadata associated with the multimedia content and a plurality of photo stories associated with each user. The multimedia content may encompass various types of content including, but not limited to, audio files, video files, digital photos, graphical user interface files, any other multimedia content that can be rendered on a client and any combinations thereof.

Contextual information, as used in this application, includes specific information related to multimedia content. The contextual information can encompass one or more of W4 attributes defining the who, what, where and when of the captured multimedia content that defines the social, spatial, temporal and geographical aspect that describe the context under which a multimedia content was captured. Some of the context may include date and time the multimedia content was captured, global positioning system (GPS) coordinates identifying a location of the captured multimedia content, identity of a person capturing the multimedia content, description of the multimedia content, identification and description of event associated with the multimedia content, etc. By identifying the contextual information, the multimedia content can be grouped or categorized efficiently so that the photo stories can be rendered in a meaningful way.

Figure 2:
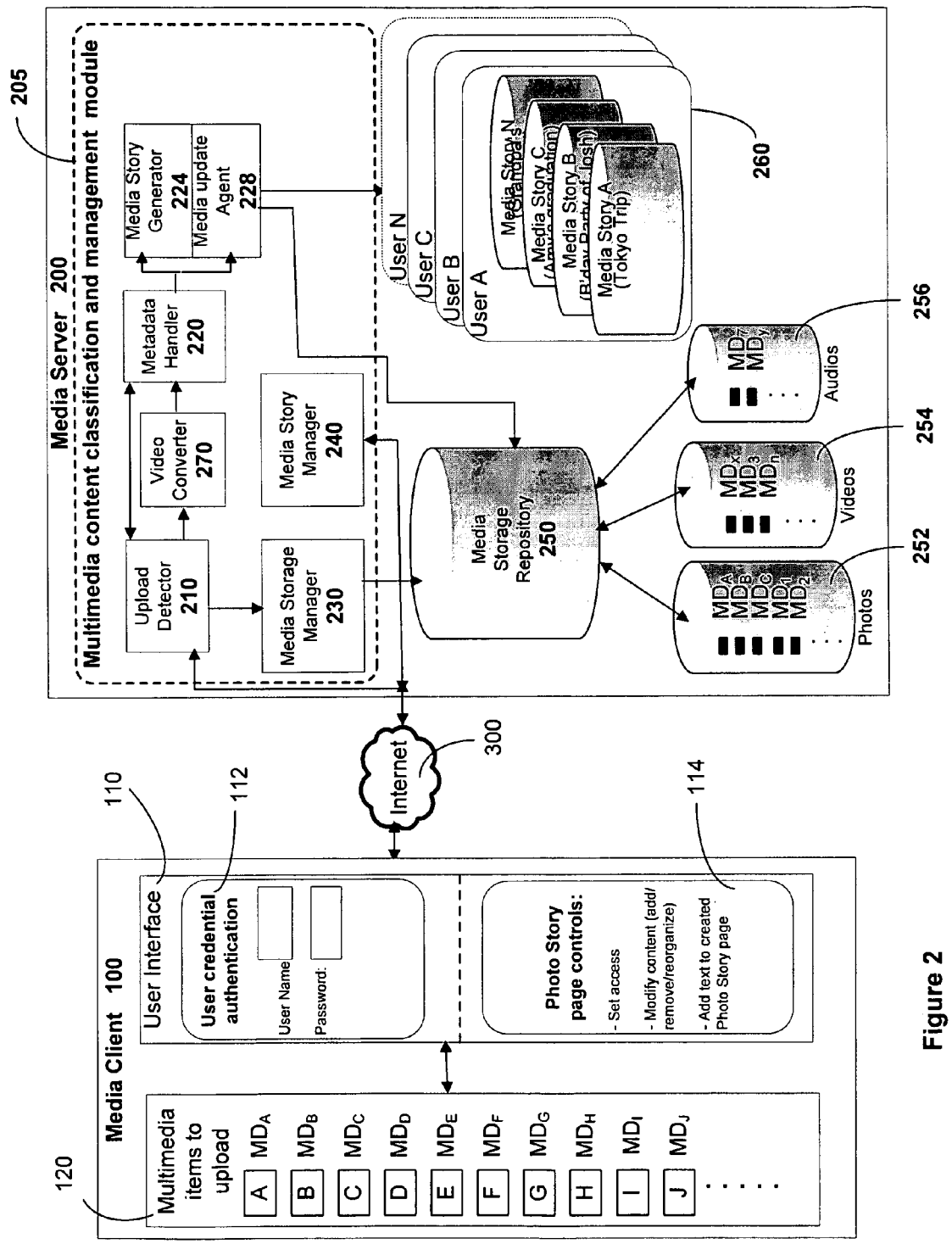
FIG. 2 illustrates a simplified data flow through the various components of the system used in rendering context aware multimedia content, in one embodiment of the invention.

FIG. 2 illustrates data flow diagram used for rendering context aware multimedia content using the various components of the system described above, in one embodiment of the invention. A client 100 is used to receive and upload a plurality of multimedia content. The client 100 includes a user interface 110 for interacting with a server 200 through a network. The user interface 110 may include a user authentication logic that provides an interface 112 to authenticate a user prior to allowing uploading of captured multimedia content. A plurality of captured multimedia content 120 are uploaded first to the client and then transmitted to the server 200 through a network, such as the internet 300. The uploaded multimedia content includes metadata associated with it. As illustrated in FIG. 2, each of the multimedia content, contents A, B, C, D, etc., have corresponding metadata associated with them, $MD_A$, $MD_B$, $MD_C$, $MD_D$, etc. As explained earlier, these metadata may provide the spatial, temporal, geographical and social attributes of the associated multimedia content. The client also includes a photo story page control logic that provides an interface 114 to control access to the multimedia content, manage the multimedia content and receive additional metadata to the multimedia content rendered in one or more photo stories. The plurality of captured multimedia content 120 is then transmitted to the server 200 through a network, such as the internet 300.

The server 200 includes a multimedia content classification and management (classifier) module 205 to detect the multimedia content transmitted by the client, manage, generate photo story and update the photo story using various modules embedded within. The classifier module 205 includes an upload detector module 210 that provides logic to detect the multimedia content received from the client 100. Upon detecting the multimedia content, the upload detector 210 forwards the multimedia content to a metadata handler module 220. In one embodiment, if the multimedia content is a video clip or film, then the classifier module 205 includes a video converter logic 270 to convert a video clip into digital images. When a video clip is received at the upload detector 210, the video clip is forwarded to the video converter module 270 to extract one or more digital images along with metadata and forwarded the extracted information to the metadata handler 220. The video converter logic detects bounded ends of an image and separates the digital image identified by the two bounded ends to generate the individual image. The metadata handler 220 identifies the metadata and classifies the image into one or more groups based on the contextual information. The group of digital images is then used to create a photo story by identifying contextual information associated with the image. In another embodiment, the video clip/film is retained as a video file and the photo story is generated by classifying the video file using the metadata associated with it.

The metadata handler module 220 identifies the metadata associated with the multimedia content, determines the contextual information from the metadata, classifies and groups the metadata based on the contextual information into a plurality of groups. Each of the plurality of groups may represent a distinct category. Upon creating the plurality of groups, the metadata handler 220 determines if the one or more groups are related to any one or more existing photo stories. If a group is not related to any existing photo story, the metadata handler 220 forwards each of the groups to a media story generator 224. If a group is related to an existing photo story, then the metadata handler 220 forwards the group to a media update agent module 228.

The media story generator 224 within the classifier module 205 uses the groups of multimedia content and generates photo stories for each group, if one has not already been generated. It should be noted here that the term photo story is to be broadly applied to include story generated using multimedia content for a group and is not restricted to only photos or digital images. The media story generator 224 uses the contextual information from the metadata to weave a story line for each group using plurality of content rich documents. The content rich documents for each group are selected based on the grouping information for the corresponding group and reflect a general theme appropriate for the corresponding group. For instance, if the plurality of multimedia content within a group includes a birthday cake and a Mickey Mouse theme or a Toy Story theme, then the multimedia content associated with the birthday cake and Mickey Mouse/Toy Story theme would be automatically grouped under a child's birthday category and the content rich documents would be associated with a children theme. On the other hand, if the multimedia content was associated with a birthday cake and an office setting, then the grouping would automatically be for an adult's birthday party and the content rich documents suggested for rendering the multimedia content would reflect this grouping. The content rich documents may be defined as mini webpages, in one embodiment. Thus, the media story generator 224 includes the logic to recognize the contextual information and suggest appropriate theme for rendering the multimedia content.

In the case where one or more groups of multimedia content are for a story line that has already been generated, then the metadata handler 220 forwards the one or more groups to a media update agent module 228. In this case, the media story generator module 224 is by-passed since a photo story for each of the groups has already been generated. The media update agent module 228 treats the multimedia content as an update to the existing photo stories and integrates each group of multimedia content with the appropriate photo story. Further, the media update agent module 228 updates the multimedia content and the associated metadata to a media story database 260 under corresponding photo stories so that subsequent rendering of the photo stories will include the updated information from the current multimedia content. As can be seen, the media story database 260 is a repository of various media stories for a plurality of users from which appropriate photo stories are retrieved for rendering. The media update agent module 228 also updates the multimedia content of each group to the media storage repository 250 so that the media storage repository 250 includes the updated information associated with each and every group.

In addition to forwarding the multimedia content to the metadata handler 220 for generating and updating photo stories, the upload detector 210 forwards the multimedia content to a media storage manager 230 for storage. Media storage manager 230 uploads the multimedia content into a media storage repository 250 for storing so that the multimedia content may be used for subsequent rendering. The media storage repository 250 may sort the multimedia content based on the type of multimedia content and store the multimedia content according to the type. In one embodiment, the multimedia content is stored in a plurality of sub-repositories with each sub-repository storing a particular type of multimedia content. For instance, the multimedia content may include photos, audio files, videos files, GUI files or any other type of multimedia files that can be rendered on the client 100. As a result, in one embodiment, the media storage repository 250 includes a photo sub-repository 252 to store photos, a video sub-repository 254 to store video files, an audio sub-repository 256 to store audio files, and so on. In this embodiment, the plurality of sub-repositories are integrated into the media storage repository. In one embodiment, the sub-repositories are external to the media storage repository 250 but are accessible by the media storage repository 250.

After the photo stories have been generated and/or updated, a user may access the photo stories using the photo story page control (page control) through the interface 114. The page control interface 114 includes controls to set access to the various photo stories generated and maintained by a user, modify content at one or more photo stories and to provide additional metadata to one or more multimedia content rendered in a photo story. Some of the access permissions include permission to view, update, delete, add additional meta data, etc. The access permissions listed herein are exemplary and is not exhaustive. Other permissions may be set as deemed necessary by the user so that the photo stories can be shared with other users in a secure fashion. The permissions may be set based on content of a photo story or based on a user or a combination of both. Setting permissions to access the photo stories is similar to setting permission to view other contents on the internet and is, therefore, not discussed in much detail.

Upon generating photo stories, other users access the photo stories and manage content and metadata associated with the photo stories based on the permission granted by the original user at each of the photo stories. The changes may include additions, deletions and/or reorganizations of one or more multimedia content in the photo story. The changes and updates to a photo story rendered at the user interface on the client 100 are transmitted to the server 200 for update. Some of the changes may include adding additional multimedia content, changing multimedia content, reorganizing the multimedia content within a photo story, adding metadata, etc. The changes and updates are received at the upload detector 210 and at a media story manager 240. The upload detector 210 identifies additions and forwards the additions to the metadata handler 220, which then updates the appropriate photo story using a media update agent module 228. The media story manager 240 receives the access permissions and changes to the photo stories. The media story manager 240 updates the appropriate media story database 260 and media storage repository 250 through metadata handler 220 and media update agent 228. Additionally, the media story manager retrieves the appropriate photo stories from the media story database 260 based on the permission and returns the media story to the client for rendering. The photo story is rendered at the client and engages other user's attention.

In addition to adding, changing and reorganizing multimedia content within a photo story, a user may provide additional metadata or modify the metadata for a multimedia content within the rendered photo story within a group. The additions or changes for each of the plurality of multimedia content are received at the upload detector 210 and forwarded to the metadata handler module 220. Upon receiving the additions or changes to the metadata, the metadata handler module 220 examines the additions and/or changes to the metadata for each multimedia content to identify the contextual information. If the received contextual information for a multimedia content is different from the contextual information of the corresponding group with which the multimedia content is associated, then the metadata handler module 220 forwards the information to the media update agent module 228 which searches the media story database to identify a new group that matches the changed contextual information of the multimedia content. The update agent module 228 then regroups the multimedia content to the new group. If the update agent module 228 is not able to find a photo story whose contextual information matches the contextual information from the update metadata, then the contextual information along with the related multimedia content is forwarded to the media story generator 224 to generate a new photo story. The new or the updated photo story is updated to the media story database 260 and the media storage repository 250 by the media update agent module 228. If, on the other hand, the contextual information is in addition to the existing contextual information, then the media update agent module 228 updates the contextual information to the corresponding multimedia content in the group. The additional metadata is stored in a multimedia content database along with the original metadata and used to better categorize and manage the multimedia content for subsequent rendering at the client.

Figure 3:
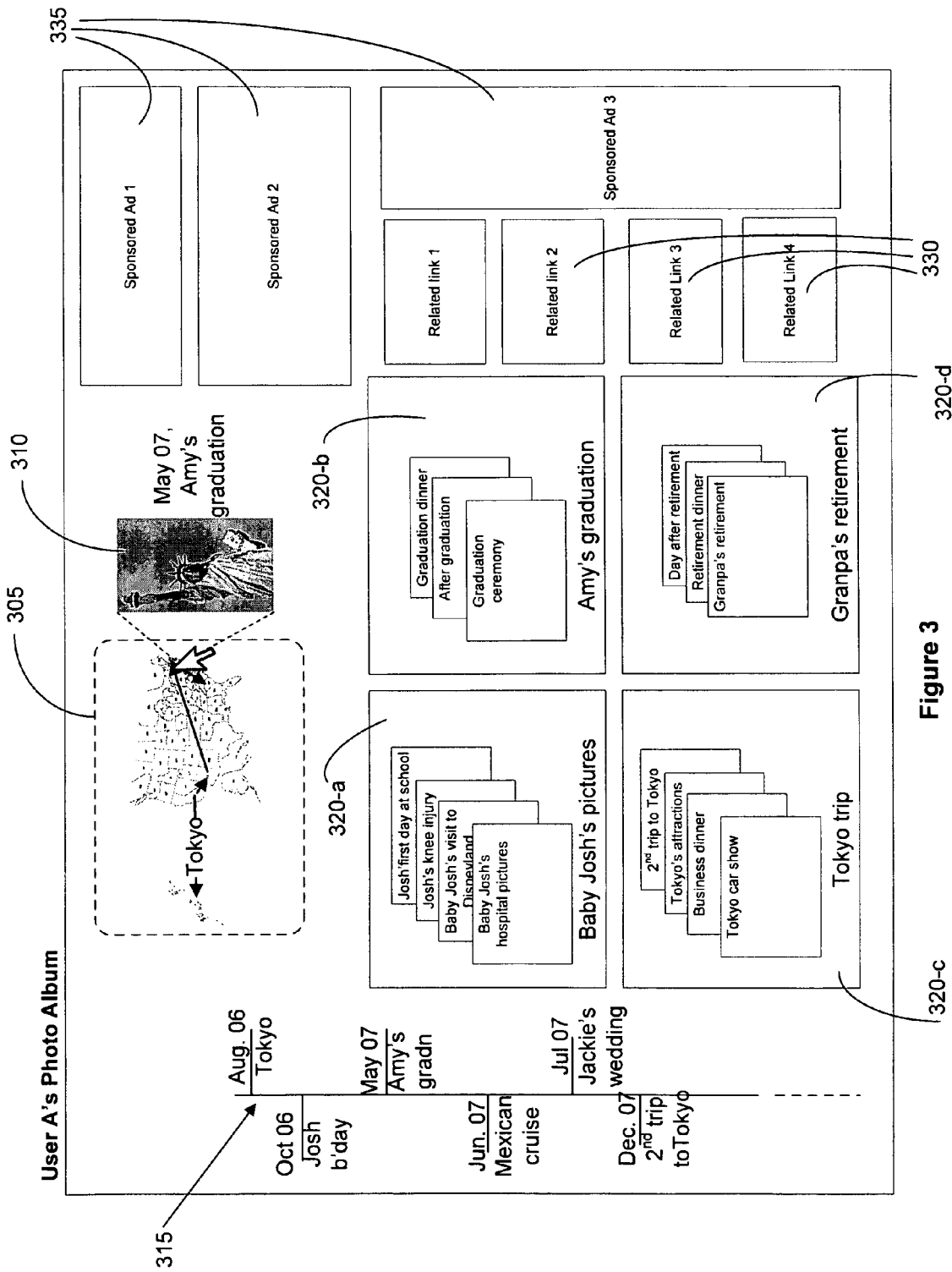
FIG. 3 illustrates a simplified content rich document used for rendering the context based multimedia content, in one embodiment of the invention.

Each photo story rendered at the client 100 includes the associated multimedia content and at least some of the metadata information associated with the multimedia content. Some of the metadata information included with the photo story may cover one or more of social, spatial, geographical and temporal aspects, such as date and time the multimedia content was captured, event information, location, etc. A sample content rich document featuring a plurality of photo stories rendered in response to a user's request is shown in FIG. 3. As mentioned, a content rich document is provided in response to a user request. The content rich document includes a plurality of photo stories, 320-a, 320-b, 320-c, 320-d, that one or more users are permitted to view by the user to whom the photo story belongs. In addition to the multimedia content, additional information related to the photo stories may also be rendered. For instance, a timeline related to the one or more photo stories in the content rich document may also be rendered alongside the photo stories so that the user can relate the time with the one or more events associated with the one or more photo stories. In addition to the time line, the content rich document may also include a map identifying a location of the events associated with the photo stories. As illustrated, a timeline 315 and a map 305 related to the photo stories are rendered alongside the photo stories. The timeline 315 and map 305 shown in FIG. 3 is one example of providing temporal and geographical information associated with one or more events in the content rich document. Other forms and ways of providing temporal and geographical information may also be used. In addition to the timeline and map, other information related to the photo stories may also be rendered alongside the photo stories.

The map shown in FIG. 3 highlights some cities in the continental U.S.A. and Japan. These cities are associated with events that have been captured in the one or more photo stories. Additionally, arrows depicting direction or path followed when capturing multimedia content are also rendered on the map to enable one to visualize the chronological sequence of events. In one embodiment, the map may also provide the ability to obtain additional information associated with an event location. For instance, the map may provide some tool tips that are activated using a mouse-over feature. FIG. 3 illustrates one such tool tip activated by a mouse-over feature. Thus, when a mouse is positioned over New York city, which is related to one of the events in one of the photo stories, metadata information associated with the event in New York city is rendered as a tool tip 310. In addition to metadata information, the tool tip may also provide additional information associated with the place. For instance, interesting facts and news bits may be provided to assist a user to familiarize with the geographic location.

In addition to the information described above, other information related to the one or more photo stories may also be rendered alongside the photo stories. In one embodiment, the additional information may include related links 330 to one or more webpages. These links may be provided to enable a user to obtain additional information for one or more aspects of a photo story. For instance, in the embodiment shown in FIG. 3, one of the related links 330 may include travel information, another link may highlight important tourist events, still another link may provide information related to weather, preferred places to stay, etc. Additionally, one or more sponsored advertisements 335 may also be rendered alongside the photo stories. These sponsored advertisements 335 are selected so as to relate to one or more events in the one or more photo stories. Thus, a sponsored advertisement may be from a travel agent advertising best deals to New York city or to Japan. Another sponsored advertisement may be from hotels and motels available at an event location in a photo story. As can be seen, the content rich document provides various tools and information links along with the photo story to engage a user's interest. In one embodiment, the photo stories may themselves be incorporated as links from other webpages defined by a user.

Figure 4:
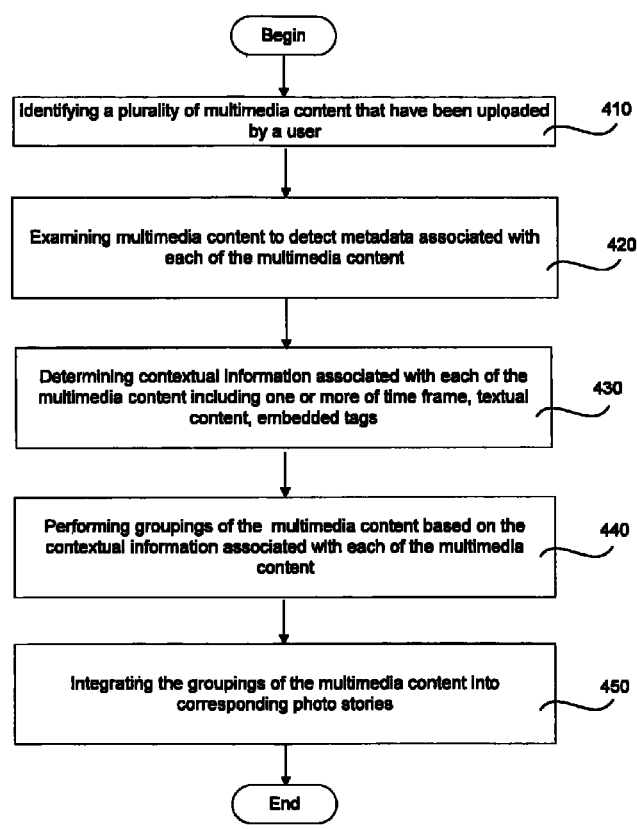
FIG. 4 illustrates a flowchart of process operations involved in rendering context aware multimedia content, in one embodiment of the invention.

With the above detailed description of the various embodiments, a method for rendering context aware multimedia content will now be described with reference to FIG. 4. The method begins at operation 410 where a plurality of multimedia content is identified. A plurality of multimedia content capturing a plurality of events is uploaded to a client and transmitted to a server. The multimedia content may contain one or a combination of different types of multimedia content, such as photos, audios, videos, etc. The multimedia content received at the server is examined by a classifier module, as described with reference to FIGS. 1 and 2, to detect metadata associated with each of the plurality of multimedia content, as illustrated in operation 420. Contextual information associated with the multimedia content is identified from the metadata, as illustrated in operation 430. The contextual information provides one or more of the temporal, spatial, geographical and social aspect of the multimedia content. The plurality of multimedia content is grouped into one or more groups based on the contextual information, as illustrated in operation 440. The process concludes at operation 450 where in each of the groups of the multimedia content is integrated into a corresponding photo story.

During integration, the method tries to identify one or more photo stories that have already been defined to identify the contextual information associated with each of the photo stories. If the contextual information associated with an already defined photo story matches the contextual information associated with a group of multimedia content, then the group of multimedia content is integrated into the identified photo story. If the contextual information of a group of multimedia content does not match an existing photo story or if there are no photo stories generated, then a new photo story is generated. The new photo story includes all the multimedia content of the group along with additional information links and tool tips as described earlier. The additional information together with the photo story is rendered at the client in response to one or more users' requests. The photo stories provide an interesting viewing experience to the users. As more and more users view the photo stories, the original user, who captured the multimedia content, is motivated to add more and more photo stories, thereby making this an effective sharing and socializing tool.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for rendering context aware multimedia content, comprising:
    identifying a plurality of multimedia content uploaded for rendering;
    examining the uploaded multimedia content to determine metadata associated with each of the plurality of multimedia content;
    identifying contextual information associated with the multimedia content from the metadata;
    performing a grouping of the multimedia content into a plurality of groups based on the contextual information; and
    integrating the one or more groups into one or more photo stories, wherein the one or more photo stories are defined as content rich documents for rendering the groups of multimedia content, wherein the integrating further includes identifying and integrating a theme for rendering each of the photo stories based on the contextual information of the multimedia content in the respective group, and integrating one or more of a timeline map, a minimap, one or more of other photo stories and other contextual map, the timeline map, minimap, other photo stories and contextual map configured to be rendered alongside the one or more photo stories and are interactive so as to provide additional information related to temporal, geographical, contextual and social aspect related to the one or more events captured within the multimedia content or the one or more photo stories.

2. The method of claim 1, wherein the metadata is embedded within the multimedia content, wherein the metadata encompasses one or more of social, temporal, geographical and spatial aspect of the multimedia content.

3. The method of claim 1, wherein examining the uploaded multimedia content further includes analyzing one of a textual content or characteristics of an image to obtain contextual information of the multimedia content, wherein the contextual information is used in categorizing the multimedia content into corresponding one or more categories when generating a photo story.

4. The method of claim 1, wherein integrating the one or more groups further includes,
    identifying a pre-defined photo story with contextual information that matches the contextual information associated with a group of the multimedia content; and
    updating the identified pre-defined photo story with the multimedia content from the group of multimedia content.

5. The method of claim 4, further includes,
obtaining additional contextual information associated with each of the multimedia content at the content rich document upon rendering the photo story of multimedia content; and
updating the metadata associated with each of the multimedia content within the rendered photo story with the additional contextual information, the updated metadata providing increased contextual information for subsequent grouping of the multimedia content.

6. The method of claim 4, wherein when the contextual information associated with a group of multimedia content does not match a pre-defined story, the method further includes,
examining the metadata associated with the multimedia content to determine a type of event and category associated with the multimedia content; and
generating a new photo story for rendering the multimedia content based on the type of event and category.

7. The method of claim 6, wherein the new photo story is stored in a media story repository along with the pre-defined photo stories for sharing with other users.

8. The method of claim 1, further includes,
rendering one or more photo stories as content rich documents in response to a user's request;
receiving one or more changes to a multimedia content in response to the rendered photo story;
analyzing the one or more changes to identify metadata associated with the multimedia content;
automatically updating the change to the rendered photo story when the one or more changes include metadata with contextual information that match the contextual information associated with the rendered photo story for a user, the updated multimedia content stored in a media story repository and a multimedia repository for future rendering.

9. The method of claim 8, wherein updating the change further includes generating of sub-groupings and sub-photo stories within the corresponding groupings and photo stories.

10. The method of claim 8, further includes,
when the contextual information of the multimedia content associated with the change does not match the contextual information associated with the photo story,
searching the media story repository to determine if contextual information associated with other photo stories of the user matches the contextual information associated with the change;
identifying a new photo story of the user with contextual information matching the contextual information of the multimedia content, wherein the new photo story is different from the photo story currently associated with the multimedia content with the change; and
regrouping the multimedia content so as to be integrated into the identified new photo story, the regrouping removing the multimedia content from the current photo story.

11. The method of claim 10, wherein when the searching of the media story repository does not find a match of any photo story, generating a new photo story using the contextual information associated with the multimedia content having the change.

12. The method of claim 1, wherein integrating the one or more groups further includes providing permission to a group of users to access the multimedia content rendered in the photo stories, the permission based on status of a user within the group of users.

13. The method of claim 1, further includes,
when the multimedia content is one of a video clip or a film,
converting the video clip or the film into individual pictures by determining shot boundaries, the individual pictures being rendered along with the video clip or the film in the mini-webpages.

14. A system for rendering context aware multimedia content on a client, comprising:
a server,
a content classifier and management module disposed on the server, the content classifier and management module having code logic which when executed by the server enables management of multimedia content for rendering on a client including,
an upload detector logic to identify a plurality of multimedia content uploaded for rendering;
a metadata handler logic to,
examine the uploaded multimedia content to determine metadata associated with each of the plurality of multimedia content;
detect contextual information associated with the multimedia content from the metadata;
perform a grouping of the multimedia content into a plurality of groups based on the contextual information, each of the plurality of groups defining a distinct category;
define a theme for each of the plurality of groups based on the contextual information associated with the respective group;
a media update agent logic to integrate the one or more groups into one or more photo stories based on the metadata, wherein the integration includes integrating one or more of a timeline map, a minimap, one or more of other photo stories and other contextual map for rendering alongside the one or more photo stories, the timeline map, minimap, other photo stories and contextual map are interactive and provide additional information related to temporal, geographical, contextual and social aspect related to the one or more events captured within the multimedia content included in the one or more photo stories and a corresponding theme defined for the respective group, the one or more photo stories defined as mini-webpages for rendering the groups of multimedia content.

15. The system of claim 14, wherein the content classification and management module further includes,
a media story generator logic to create a new photo story when the one or more photo stories do not match the contextual information associated with a group of the multimedia content; and
a media story manager logic to manage the contents of the one or more photo stories based on updates received from the client.

16. The system of claim 14, further includes a media storage repository for storing the distinct categories, multimedia content and one or more photo stories for future mining, wherein the content classification and management module further includes a media storage manager logic to interact with the media storage repository to store and retrieve multimedia content.

17. The system of claim 14, further includes a video converter module to convert video clip or film of the multimedia content to individual digital images, the video converter module having logic to identify the individual digital images by determining boundaries encompassing each digital image, the individual digital images being rendered along with the video clip or the film in the mini-webpages.

18. A method for rendering context aware multimedia content, comprising:
- identifying a plurality of multimedia content uploaded for rendering;
- examining the uploaded multimedia content to determine metadata associated with each of the plurality of multimedia content;
- identifying contextual information associated with the multimedia content from the metadata;
- performing a grouping of the multimedia content into a plurality of groups based on the contextual information; and
- integrating the one or more groups into one or more photo stories, wherein the one or more photo stories are defined as content rich documents for rendering the groups of multimedia content,
- wherein the integrating further includes identifying and integrating one or more interactive maps related to the groups of multimedia content, the interactive maps rendered with the photo stories and includes links to information for one or more events associated with the one or more photo stories.

19. The method of claim 18, wherein the link is one of an internal link or an external link, wherein the internal link provides access to metadata information associated with the one or more events and the external link provides access to one or more related webpages for obtaining additional aspects of the photo stories.

* * * * *